Dec. 6, 1932.  F. KASANTZEFF  1,890,087
TRIPLE VALVE FOR AUTOMATIC RAILWAY BRAKES
Filed Feb. 26, 1929
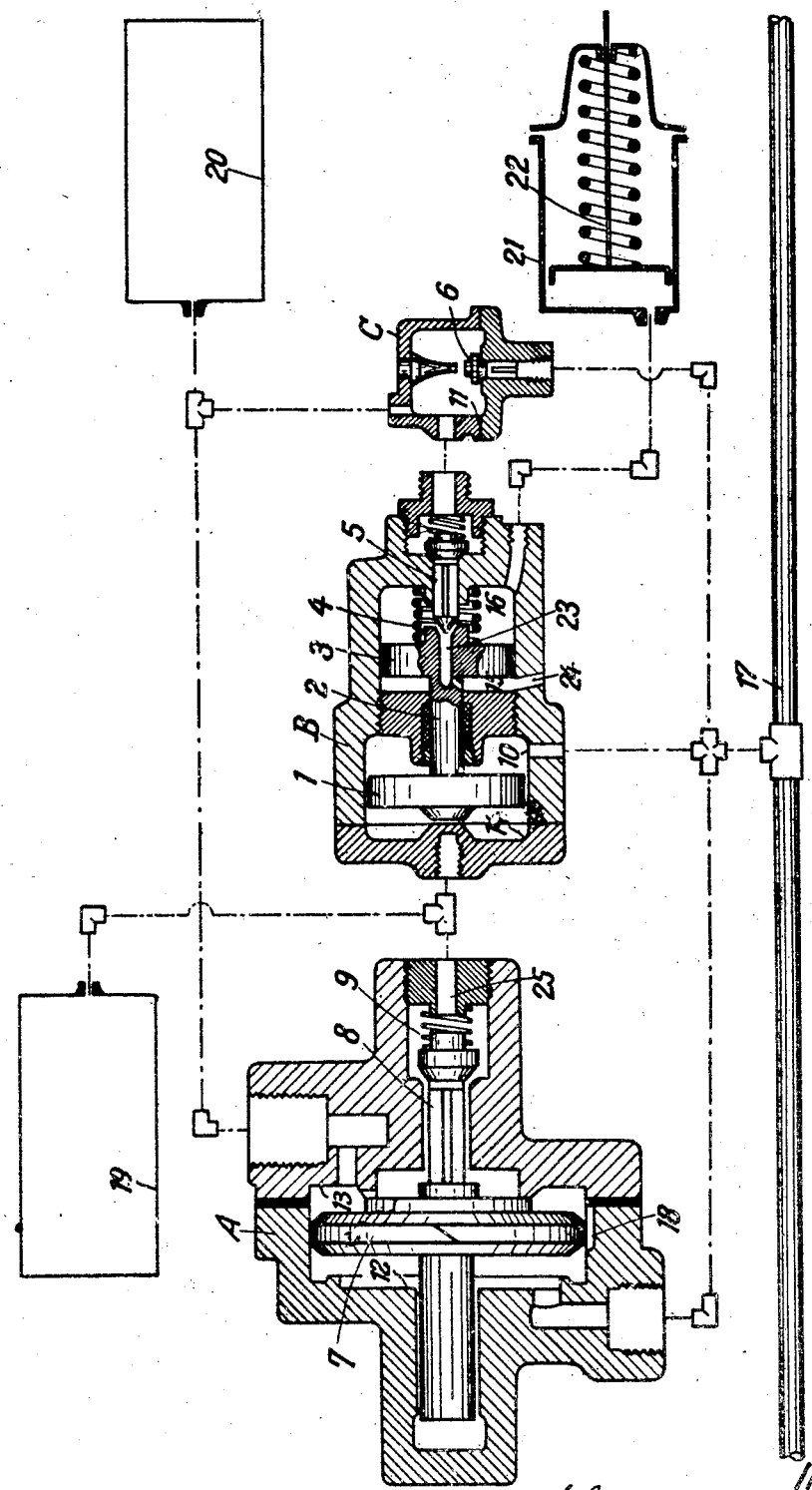
Inventor:
Florentin Kasantzeff
By Bilinger Atty.

Patented Dec. 6, 1932

1,890,087

UNITED STATES PATENT OFFICE

FLORENTIN KASANTZEFF, OF BERLIN, GERMANY

TRIPLE VALVE FOR AUTOMATIC RAILWAY BRAKES

Application filed February 26, 1929, Serial No. 342,736, and in Russia October 30, 1927.

The invention relates to a triple valve for compressed air brakes as used in railways.

The essential feature consists therein, that the triple valve includes a control chamber, which during braking applications remains closed and filled with constant pressure, whereas during operation of releasing the brakes the pressure in said chamber is reduced to an extent corresponding to the simultaneous increase of pressure produced in the train pipe. With this triple valve, further, a supplemental reservoir can be used, which is in connection with the said closed chamber and serves when releasing the brakes for feeding the usual auxiliary air reservoir.

This arrangement has the advantage, that partial release of the brakes can be effected with very precise graduation, and the release is very effectively accelerated, but without any hindrance to the successive refilling of the usual auxiliary air reservoir, so that any danger, such as otherwise arises with single train pipe brakes by lack of pressure in consequence of several quickly successive braking applications, is avoided.

The invention is shown by way of example in the accompanying drawing, in which an embodiment comprising a three part triple valve, a brake cylinder and auxiliary air reservoir is shown, partly in section.

Referring to the drawing, the triple valve consists of three main parts A, B, C connected to each other by suitable pipes. The part B contains two pistons 1, 3 united by a piston rod 2 and loaded by a spring 4 in the direction of the larger pistons, so as to cause a double valve 5 to open on one seat on the piston 3 and close on the other seat on the outer wall of the part B, said valve 5 on this side being loaded by a weak spring 5a and the pressure existing in the part C. The part C contains a feed valve 6. The part A contains a large piston 7 for governing a simple check valve 8 loaded by a spring 9.

The chambers included between the several pistons are designated as follows: train pipe chamber 10, accelerating chamber 11, control chamber 14 adjoining to the main piston 1, releasing chamber 12 adjoining to one side of the piston 7 and a passage chamber 13 adjoining to the other side of the piston 7 and serving as passage from the auxiliary reservoir to the control chamber 12, atmospheric chamber 15, brake cylinder chamber 16. A brake pipe 17 is provided and connected, as in usual single train pipe brakes, for feeding the reservoirs and governing the brakes. In addition to a usual auxiliary air reservoir 20, a second air reservoir 19 connected to the control chamber 14 is provided. A brake cylinder 21 and its piston 22 are arranged in usual manner. Passages 18, 23, 24 serve for governing the several actions as follows.

During the charging of the brake the air passes from the train pipe 17 to the chamber 10, so as to move the pistons 1, 3 to the left, and simultaneously to the releasing chamber 12, so as to move the piston 7 to the right, which brings the chambers 12 and 13 in connection through the slot 18 and by opening the valve 8 allows air to pass to the control chamber 14 and to the supplementary reservoir 19. At the same time air passes from the passage chamber 13 to the usual auxiliary reservoir 20; both reservoirs are at once charged up also through the accelerating chamber 11. The equal pressures thus produced in the train pipe and in the reservoirs 19, 20 cause the pistons 1, 3 and 7 to remain balanced in the positions shown. The brake cylinder 21 is open to the atmosphere through the passages 16, 23, 15, 24.

During braking by reducing the pressure in the train pipe 17, the large piston 7 goes to the left, so as to shut off the chambers 12 and 13 from each other and allow the check valve 8 to shut off the control chamber 14 and reservoir 20. The simultaneous reduction of pressure in the chamber 10 causes the pistons 1, 3 to go to the right, so as to close their passage 23 on the double valve 5 and disconnect the brake cylinder 21 from the atmosphere, whereas on a further movement of the pistons 1, 3 they open the other seat of the double valve 5, so as to allow air to pass from the train pipe 17 and the auxiliary reservoir 20 to the brake cylinder through the passages 11, 5 and the chamber 16. As soon as a certain pressure is adjusted in the chamber 16 and in the brake cylinder the pistons 1, 3 go to the left under the action of the brake cylinder pressure and the spring 4 and the double valve 5 shuts off the chambers 11 and 16 against each other under the action of the spring 5a and the pressure existing in the chamber 11. Thereby the degree of braking adjusted is maintained, as any want of balance arising from leakage at any point causes the pistons 1, 3 to move and either feed air to or exhaust it from the different chambers. In the example shown the pressure increase in the brake cylinder is three times as great as the drop of pressure produced in the train pipe 17 and in the chamber 10, that is to say that the brake cylinder pressure increases from, for example, 0 to 1.5 atmospheres, if the pressure in the train pipe decreases from 5.0 to 4.5 atmospheres.

As soon as any other degree of braking is adjusted in the train pipe 17, the pistons 1, 3 assume the same balance position with a correspondingly altered brake cylinder pressure and maintain this pressure in the same way, and the same is true up to a maximum reduction of pressure of about 1.2 atmospheres in the train pipe 17, corresponding to application of the brakes with the highest desired pressure.

During all braking applications the control chamber 14 and the supplementary reservoir 19 remain closed and charged with the normal train pipe pressure.

On releasing the brakes by increasing the pressure in the train pipe 17, the pistons 1, 3 and the double valve 5 effect a reduction of the braking force in the described manner, also the piston 7, going to the right, opens the valve 8 and allows air to pass from the chambers 14, 19 to the auxiliary reservoir 20, so that the pressure in the control chamber 14 falls, whereas the simultaneous increase of pressure in the chamber 10 moves the pistons 1, 3 to the left, so as to open the brake cylinder to the atmosphere, until again a balance between the pressures in the brake cylinder and in the train pipe and auxiliary reservoir is obtained and the large piston 7 goes again to the left so as to close the valve 8. Thus, in correspondence with the variable pressure in the control chamber 14 and reservoir 19 the degree of release of the brakes is again maintained by the to and fro movement of the pistons 1, 3, until any other releasing or braking degree is adjusted by varying the pressure in the train pipe 17.

Complete release of the brakes is effected by increasing the pressure in the train pipe up to the pressure existing in the control chamber 14 and reservoir 19; a further increase up to the original pressure, existing before the braking, being unnecessary.

The final pressure in the chamber 14 and reservoir 19 depends upon the volume of the reservoir 19. If said volume is large, a higher train pipe pressure is required than with a smaller volume; thereby a fine regulation of the brakes is rendered possible.

In the accelerating chamber 11 arranged immediately before the inlet to the brake cylinder chamber 16 the feeding passage coming from the auxiliary reservoir 20 and eventually also the passage coming from the train pipe 17 are made so narrow, that during braking applications the pressure in the chamber 11 falls suddenly whereby the air goes from the chamber 11 to the brake cylinder 21 so as to apply quickly but smoothly the brake blocks and a shock in applying the brake is avoided, whereas afterwards the adjusted pressure comes into full action on the applied brake blocks.

I claim:

1. A triple valve for automatic railway brakes, comprising in combination a valve governing the air inlet and exhaust of the brake cylinder, an air pressure transmitting member governing said valve, a chamber connected to the train pipe on one side of said air pressure transmitting member, a control chamber adjoined on the other side of said air pressure transmitting member during all graduations of braking and releasing, a check valve for closing said control chamber during braking applications so as to enable said control chamber to retain a constant air pressure acting on the air pressure transmitting member, and means dependent upon the air pressures existing in the auxiliary reservoir and in the train pipe for exhausting air from said control chamber immediately to the usual auxiliary reservoir by each pressure increase produced in the train pipe.

2. A triple valve for automatic railway brakes, as claimed in claim 1, wherein an additional air reservoir is connected to the control chamber.

3. A triple valve for automatic railway brakes, as claimed in claim 1, wherein the means for exhausting air from the control chamber consist of an air pressure transmitting member loaded on one face by the train pipe pressure and on the other face by the pressure existing in the auxiliary reservoir and opposed by its last named face to the check valve, so as to open the latter when moving against it.

In witness whereof I affix my signature.

FLORENTIN KASANTZEFF.